(12) United States Patent
Persson et al.

(10) Patent No.: US 8,964,416 B2
(45) Date of Patent: Feb. 24, 2015

(54) SWITCHED MODE POWER SUPPLY WITH VOLTAGE REGULATOR

(75) Inventors: Oscar Persson, Kalmar (SE); Mikael Appelberg, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 204 days.

(21) Appl. No.: 13/635,197

(22) PCT Filed: Mar. 30, 2010

(86) PCT No.: PCT/EP2010/054192
§ 371 (c)(1),
(2), (4) Date: Sep. 14, 2012

(87) PCT Pub. No.: WO2011/120558
PCT Pub. Date: Oct. 6, 2011

(65) Prior Publication Data
US 2013/0003422 A1 Jan. 3, 2013

(51) Int. Cl.
*H02M 3/335* (2006.01)
*H02M 1/36* (2007.01)
*H02M 1/42* (2007.01)

(52) U.S. Cl.
CPC .......... *H02M 3/33507* (2013.01); *H02M 1/36* (2013.01); *H02M 3/33523* (2013.01); *H02M 1/4233* (2013.01)
USPC ........................................ 363/21.01

(58) Field of Classification Search
USPC ................ 363/21.01–21.18, 97, 131
See application file for complete search history.

(56) References Cited

U.S. PATENT DOCUMENTS

| | | |
|---|---|---|
| 3,959,714 A | 5/1976 | Mihelich |
| 4,694,386 A | 9/1987 | deSartre |
| 8,300,432 B2 * | 10/2012 | Appelberg ................. 363/21.14 |
| 2008/0259659 A1 | 10/2008 | Choi et al. |
| 2009/0185397 A1 | 7/2009 | Forghani-Zadeh et al. |

FOREIGN PATENT DOCUMENTS

EP 0 193 435 A1 9/1986

* cited by examiner

*Primary Examiner* — Adolf Berhane
*Assistant Examiner* — Afework Demisse

(57) ABSTRACT

A power supply and method for reliable turn-on of a switched mode power supply (SMPS) in which the same transformer is used for providing power from the primary side to both the main output of the SMPS and a secondary side voltage regulator a train of voltage pulses are transmitted, from the primary side to the secondary side. The voltage regulator generates a feedback signal indicating when it has turned on and is operating, and the transmission of pulses within the train is controlled based on the detection of feedback signal. In this way, only the required amount of power to switch on the voltage regulator is transferred to the secondary side during a start-up operation and excess power at the main output is prevented, thereby avoiding distortion of the desired start-up ramp figure.

13 Claims, 6 Drawing Sheets

SWITCHED MODE POWER SUPPLY WITH VOLTAGE REGULATOR

TECHNICAL FIELD

The present invention generally relates to the field of switched mode power supplies (sometimes referred to as switch mode power supplies or switching mode power supplies) and more specifically to the control of the power for switching on a voltage regulator for controlling the output voltage of the switched mode power supply.

BACKGROUND

The switched mode power supply (SMPS) is a well-known type of power converter having a diverse range of applications by virtue of its small size and weight and high efficiency. For example, SMPSs are widely used in personal computers and portable electronic devices such as cell phones. An SMPS achieves these advantages by switching a switching element such as a power MOSFET at a high frequency (usually tens to hundreds of kHz), with the frequency, or duty cycle, of the switching being adjusted to convert an input voltage to a desired output voltage.

An SMPS may take the form of a rectifier (AC/DC converter), a DC/DC converter, a frequency changer (AC/AC) or an inverter (DC/AC).

SMPSs are characterised by a transformer with a primary side and a secondary side that respectively define the input side and output side of the SMPS. The transformer provides isolation between the input and output sides and it is important that this isolation between the input and output of the SMPS is maintained.

A pulse width modulator (PWM) generates a duty cycle signal. The duty cycle signal is used to switch at least one transistor so as to apply the input voltage, at the duty cycle, at the inputs to the primary side of the transformer.

The input voltage at the primary side causes a voltage to be induced at the secondary side of the transformer that, for SMPS designs with a DC output, is then rectified to provide the output voltage.

With DC/DC converters and AC/DC converters in particular, voltage control is applied on the secondary side of the SMPS.

Voltage control is required for meeting the increasing requirements of regulation and dynamic performance (such as monotonic start-up, pre-bias immunity, accurate load regulation and remote voltage sensing).

Generally, it is preferred to use the secondary side alone for performing the control of the output voltage as this gives the lowest distortion of the desired ramp-up curve as well as accurate start-up performance. This can be achieved by providing a voltage regulator on the secondary side to perform voltage control.

Known systems use an additional power supply to provide a power source to the secondary side voltage regulator so that the voltage regulator can start the converter. The additional power supply is usually provided by a second transformer, within the SMPS, that transfers power from the primary side across the isolation barrier. Alternatively, a separate and independent power supply unit may be provided on the secondary side.

However, the above approaches of providing an additional power supply suffer from a number of problems. In particular, they increase the cost of the SMPS, it is more difficult to achieve higher insulation voltages, and the size of the SMPS is increased.

In view of the above problems, known systems have powered a secondary side voltage regulator with power from the primary side by transferring power across the same transformer used to transfer power to the output of the SMPS. In this way, an additional transformer is not required for transferring power across the isolation barrier.

However, with known systems that adopt the above approach, power supplied to switch on the voltage regulator is also supplied to the output of the SMPS. This causes problems when the SMPS is switched on since, to ensure a reliable start-up, it is necessary for the voltage regulator on the secondary side to already be switched on and controlling the output voltage when the output voltage is changing to its desired value. However, when such systems transfer power to switch on the voltage regulator, any excess power appears at the SMPS output. This can cause obstacles such as glitches, plateaus and distortion of the desired start-up ramp figure (i.e. the excess power causes the start-up to be non-monotonic).

Moreover, the required power to switch on the voltage regulator varies with the operating conditions (e.g. temperature). Known systems that use the same transformer to transfer power to both the output and to switch on the voltage regulator therefore need to transmit sufficient power for the voltage regulator to start under the most power demanding conditions. The problems caused by transmitting excess power cannot therefore be avoided.

SUMMARY OF INVENTION

In general the present invention provides an SMPS, and method of operating an SMPS, in which the same transformer is used for providing power from the primary side to both the main output of the SMPS and a secondary side voltage regulator. Reliable start-up is ensured by transferring only the required amount of power to the secondary side to switch on the voltage regulator and avoiding the transfer of excess power. This is achieved by sending a plurality of voltage pulses from the primary side to the secondary side such that the transmission of the pulses is controlled in accordance with a feedback signal from the voltage regulator which is generated when the voltage regulator has been switched on and is operating. In this way only the minimum power necessary to switch on the voltage regulator is transferred from the primary side to the secondary side.

More partially, according to the present invention, a switched mode power supply comprises: a transformer having a primary side and a secondary side; a main output of the switched mode power supply arranged on the secondary side; a voltage regulator arranged on the secondary side and operable to regulate the output voltage at the main output of the switched mode power supply; a power supply circuit arranged to provide a power supply on the secondary side, wherein the power supply circuit is operable to receive power from the primary side via the transformer and to output power to the main output and also to the voltage regulator; a control module on the primary side operable to control a pulse width modulator to send a voltage pulse train from the primary side to the secondary side via the transformer in order to switch on the voltage regulator; and a coupling device operable to transmit a feedback signal from the secondary side to the primary side, wherein the feedback signal is generated in dependence upon the response of the voltage regulator to the power received from the power supply circuit; wherein the control module is operable to detect the feedback signal to determine if a predetermined response of the voltage regulator has been achieved and to determine if a further pulse in the pulse train is to be transmitted from the primary side to the secondary side in dependence upon the detection of the feedback signal.

The present invention also provides a method of operating a switched mode power supply having a transformer with a primary side and a secondary side, a main output of the switched mode power supply arranged on the secondary side, and a voltage regulator arranged on the secondary side to receive power from the primary side and to regulate the output voltage at the main output of the switched mode power supply, the method being performed to switch on the voltage regulator and comprising: transmitting a voltage pulse from the primary side to the secondary side of the transformer so that the voltage pulse is received at the secondary side of the transformer and power in the voltage pulse is provided to the main output of the switched mode power supply and the voltage regulator; when the voltage regulator is caused to switch on and operate by the voltage pulse, generating a feedback signal indicating that the voltage regulator is switched on and operating, transmitting the feedback signal from the secondary side to the primary side; determining if a feedback signal has been detected on the primary side indicating that the voltage regulator is switched on and operating; when no feedback signal is detected on the primary side indicating that the voltage regulator is switched on and operating, transmitting a further pulse from the primary side to the secondary side; and when a feedback signal is detected on the primary side indicating that the voltage regulator is switched on and operating, ceasing to transmit voltage pulses from the primary side to switch on the voltage regulator.

The features of the switch mode power supply and the method of operation set out above enable voltage pulses to be transmitted from the primary side to the secondary side which will not cause excess power at the main output of the switch mode power supply, but which ensure that the voltage regulator is successfully switched on because a plurality of pulses can be transmitted until a feedback signal indicates that the switch on is successful. The features therefore solve the problem of providing reliable start-up of the voltage regulator without causing excess power at the main output of the switch mode power supply.

LIST OF FIGURES

DESCRIPTION OF EMBODIMENTS

Figure 1:
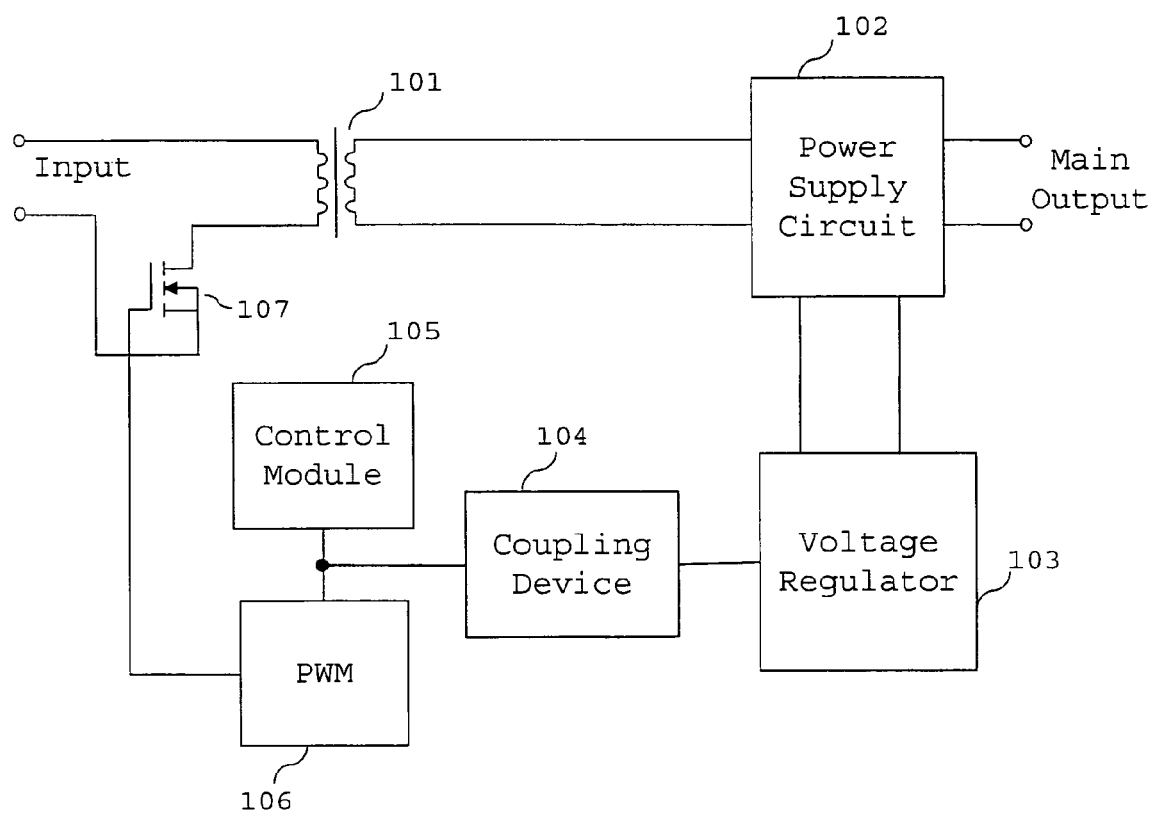
FIG. 1 is a block diagram of an SMPS according to an embodiment of the invention.

As will be explained below, embodiments of the invention provide an SMPS, and a method of operating an SMPS, in which the same transformer is used for providing power from the primary side to both the main output of the SMPS and a secondary side voltage regulator. Reliable turn on of the SMPS (i.e. start-up) is ensured by only transferring the required amount of power to the secondary side to switch on the voltage regulator and avoiding the transfer of excess power.

To start operation, an initial pulse is sent from the primary side to the secondary side to try to switch on the voltage regulator.

In an embodiment, a feedback signal that indicates the response of the voltage regulator to the initial pulse is generated on the secondary side and is transmitted to the primary side via a coupling device. In an alternative embodiment, a feedback signal is only generated and transmitted to the primary side when the voltage regulator has switched on and is operating.

The acknowledgements provided by the feedback signal, or detection of a feedback signal, during start-up allow a control module on the primary side to determine whether the voltage regulator has switched on and is operating, if the voltage regulator requires more power to switch on and operate as required or if an error in the start-up operation has occurred.

If required, further pulses are sent to the secondary side to provide more power for the voltage regulator to switch on and operate.

Accordingly, the initial pulse sent from the primary to the secondary side need not be powerful enough to switch on the voltage regulator. This allows the first pulse to be set to a low value so that excess power is not transferred to the output of the SMPS. Under most operating conditions, the first pulse will not switch on the voltage regulator and at least one further pulse will be sent to complete the switch on. It will be appreciated however, that under certain extreme operating conditions the first pulse may switch on the voltage regulator so that further pulses are not necessary.

Consequently, by generating a feedback signal and controlling the transmission of pulses from the primary side in dependence upon the feedback signal, only the required amount of power to switch on the voltage regulator is transmitted from the primary side to the secondary side.

This provides the advantage that an excess power is not transmitted to the secondary side. The problem of non-monotonic start-up is therefore avoided and it is not necessary to incur the additional cost and space requirement of an additional transformer or power supply on the secondary side of the SMPS.

An embodiment of the invention will now be described with reference to FIG. 1.

An input voltage is applied to the input terminals. One of the input terminals is connected directly to a first terminal on the primary side of transformer 101. The other input terminal is connected to a second terminal on the primary side of transformer 101 via transistor 107.

The input voltage applied to the primary side of transformer 101 is controlled by the switching on and off of transistor 107 in accordance with a duty cycle signal from PWM 106.

The secondary side terminals of the transformer 101 are connected to a power supply circuit 102. The power supply circuit provides the main output from the SMPS as well as a power supply for voltage regulator 103.

Voltage regulator 103 is operable to regulate the output voltage from the main output of the SMPS. The voltage regulator 103 receives its power supply from power supply circuit 102.

In the present embodiment, if in response to the received power from the power supply circuit 102 the voltage regulator 103 switches on and operates, then a feedback signal is generated and output to coupling device 104. The generation of such a feedback signal is an indication that voltage regulator 103 is running and that the control module 105 should stop sending pulses to switch-on the voltage regulator. More particularly, in the present embodiment, the feedback signal comprises the voltage regulation feedback signal which indicates a request from the secondary side voltage regulator for an increase in duty cycle and therefore indicates that the voltage regulator has been switched on and is operating.

The coupling device 104 is any coupling mechanism that allows transmission of the feedback signal from circuitry on the secondary side of transformer 101 to circuitry on the primary side of transformer 101 whilst maintaining the isolation between both sides of the transformer 101. A suitable coupling device is a wireless transmitter such as an optocoupler.

To ensure accurate duty cycle control during operation, some SMPS designs use a coupling device to couple a signal defining the output voltage back to a controller of the duty cycle on the primary side. If such a coupling device is already present, the same coupling device may be used to transmit the feedback signal from the voltage regulator 103 to the primary side.

The primary side output of coupling device 104 is connected to control module 105 and PWM 106.

Control module 105 is operable to detect the presence of a feedback signal output from the coupling device 104. In dependence upon the detection of a feedback signal, the control module 105 is operable to output a control signal to the PWM 106.

The output from the PWM 106 controls the switching of the transistor 107. The application of the input voltage to the primary side of transformer 101 is therefore controlled by the control module 105 via the PWM 106.

The operation of the components of FIG. 1 will now be described during a start-up operation.

Before the start-up operation, the SMPS is in a state in which there has been no power transmission across transformer 101 for such time that no power is output from the main output, no power is output from the power supply circuit to the voltage regulator 103 and voltage regulator 103 is switched off.

To begin power transmission from the primary side to the secondary side of transformer 101, control module 105 controls the PWM 106 to output a single pulse. The pulse may be defined, for example, by the output signal from PWM 106 changing from a low voltage to a high voltage for the duration of the pulse.

The pulse output from the PWM 106 switches on transistor 107 for the duration of the pulse so as to apply a pulse of the input voltage to the primary side of transformer 101.

Power is therefore transferred from the primary side of transformer 101 to the secondary side and onto the power supply circuit 102. As noted above, the first pulse during start-up is of generally low power which will not fully switch on the voltage regulator 103 and cause it to operate. This ensures that excess power is not provided at the main output of the power supply circuit 102.

Filter arrangements within the power supply circuit 102 filter the received power into power for the main output and power for the voltage regulator.

By arranging for the rise time of the filter arrangement that provides the voltage output to the voltage regulator to be a lot less than the rise time of the filter arrangement that provides the voltage output from the main output, the power supply circuit 102 outputs power to voltage regulator 103 in order for voltage regulator 103 to switch and operate on before a significant amount of power has been output from the main output of the SMPS.

The voltage regulator 103 receives power from the power supply circuit 102.

If the power received from power supply circuit 102 is sufficient to switch on the voltage regulator 103 so that it operates as required, then the voltage regulator 103 generates a feedback signal that indicates that the voltage regulator 103 has switched on and is operating. Such a feedback signal would not be expected after the first pulse in normal operating conditions.

Alternatively, if the power received from the power supply circuit 102 is not sufficient to switch on the voltage regulator 103 (i.e. the voltage regulator 103 remains switched off or is in a state between being switched off and operating as required) then a feedback signal is not generated.

When a feedback signal is generated, the feedback signal is output from voltage regulator 103 to coupling device 104 and is transmitted to the primary side.

If the control module 105 detects the presence of a feedback signal, it determines that the voltage regulator has switched on and is operating as required. Alternatively, if the presence of a feedback signal is not detected, the control module 105 determines that more power needs to be sent from the power supply circuit 102 to the voltage regulator 103 in order to switch on the voltage regulator 103 and to cause the voltage regulator 103 to operate as required.

If the control module 105 determines that voltage regulator 103 has switched on and is operating, then the control module determines that it is not necessary to control the PWM 106 to transmit further pulses in order to ensure that the voltage regulator 103 is switched on.

If, however, the control module 105 determines that the voltage regulator 103 is not yet operating as required, then the control module controls the PWM 106 to transmit a further pulse to switch on transistor 107 for the duration of the pulse.

A further pulse of the input power is transmitted from the primary side of transformer 101 to the secondary side and onto the power supply circuit 102.

The filter arrangements within the power supply circuit 102 again transmit most of the received power to the voltage regulator 103 rather than the main output of the SMPS.

Voltage regulator 103 receives the power from the second pulse and, as previously described for the first pulse, either a feedback signal is generated that indicates that the voltage regulator 103 has switched on and is operating or no such feedback signal is generated.

When a feedback signal is generated, the feedback signal is output to coupling device 104 where, as described earlier, the feedback signal is transmitted to the control module 105.

Control module 105 is operable to detect the presence of a feedback signal. In dependence upon the detection of a feedback signal, the control module 105 determines whether or not the voltage regulator has switched on and is operating, if more power needs to be sent from the power supply circuit 102 in order for voltage regulator 103 to operate as required or if an error has occurred in the start-up operation of the SMPS.

This process is then repeated with further pulses transmitted to the secondary side, if required.

Figure 2:
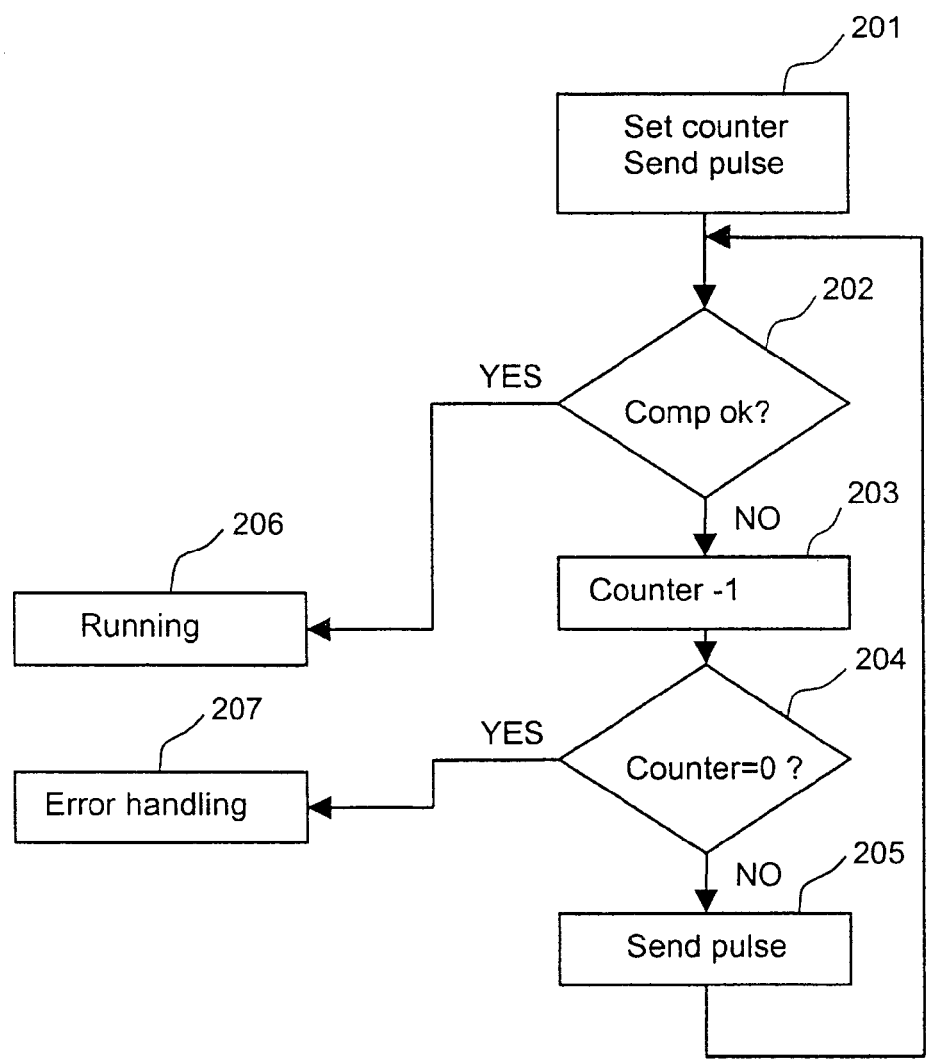
FIG. 2 is a flow chart showing the processing operations performed by a control module in an embodiment to determine if a voltage regulator has switched on and is operating, if more power is required to switch on the voltage regulator, or if an error in the start-up operation has occurred.

The process by which the control module 105 determines whether the voltage regulator 103 is switched on and is operating, whether a further pulse is required for the voltage regulator 103 to operate as required or if an error has occurred is shown in FIG. 2.

In step 201, the predetermined number of pulses to be sent before a determination is made that an error has occurred is set. A typical predetermined number of pulses is, for example, six. However, the predetermined number may be any number greater than one.

The control module 105 controls the PWM 106 to transmit an initial pulse from the primary side to the secondary side, and the transmitted power is received by voltage regulator 103 as described above.

In step 202, the control module 105 determines whether a feedback signal has been detected, as described above, in order to determine if the voltage regulator 103 has switched on and operating (i.e. voltage regulator 103 is running).

If a feedback signal has been detected, the process proceeds to step 206 and the control module 105 does not control PWM 106 to transmit a further pulse in order to switch on the voltage regulator 103.

If, however, in step 202, the control module 105 determines that no feedback signal is detected, then the process proceeds to step 203.

In step 203, the predetermined number of pulses to be sent before a determination is made that an error has occurred is reduced by one.

The process then proceeds to step 204 where a determination is made if the number of further pulses to be sent to switch on the voltage regulator 103 is zero.

If the number of further pulses to be sent to switch on the voltage regulator 103 is not zero, then the process proceeds to step 205 and the control module 105 controls the PWM 106 to send a further pulse so that additional power is sent to the voltage regulator 103.

The process then returns to step 202 to determine whether or not the voltage regulator 103 has switched and is operating.

If, however, step 204 determines that the number of further pulses to be sent is zero, then the process proceeds to step 207 where a determination that an error has occurred is made.

When an error has been detected, a possible response is for no further start-up attempts to be made until the cause of the error has been identified and the problem has been corrected.

Alternatively, in response to an error, the process may return to step 201 for a new start-up attempt to be made.

If a new start-up attempt is to be made, then there is preferably a delay between the determination that an error has occurred and the start of the new start-up attempt. The delay is required to let the power that has already been sent to the main output drain away and ensures that there is no permanent voltage build-up over the main output during a fail condition.

As described above, the control module 105 controls the PWM 106 to transmit a pulse train in order to switch on voltage regulator 103, with the number of pulses transmitted being determined by the feedback signal generated by the voltage regulator 103.

Only a single pulse is transmitted if the initial pulse sent to the voltage regulator 103 provides the voltage regulator 103 with sufficient power to switch on and operate. However, this is unlikely during normal operating conditions.

More likely, the pulse train will comprise a plurality of pulses that are sent to switch on the voltage regulator 103 until either the voltage regulator 103 switches on and operates or it is determined, after a predetermined number of pulses, that an error has occurred.

Figure 3:
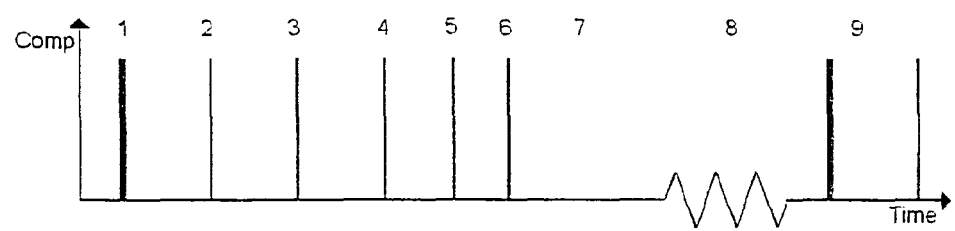
FIG. 3 is a graph showing a pulse train that is used in an embodiment to switch on a voltage regulator.

An example of a pulse train that is used in the present embodiment is shown in FIG. 3.

In FIG. 3, the y-axis indicates whether the output from the control module 105 is high or low.

The PWM 106 is arranged to control the transistor 107 such that a pulse of input voltage is sent from the primary side of transformer 101 to the secondary side of the transformer 101 with the same the duration as the pulses from the control module 105.

It is preferable for the initial pulse of the pulse train to carry more power than any subsequent pulses. The power carried by a pulse may be varied either by varying the magnitude of the input voltage applied to the primary side of the transformer and/or by varying the duration for which the pulse is applied.

In addition, it is also preferable for the duration between the later pulses to decrease. In this way, the power supply to the voltage regulator 103 is more linear and the later pulses have an increased chance of switching-on the voltage regulator 103 so that is operates because more power is delivered by the later pulses as a whole due to the shorter time duration between them.

As shown in FIG. 3, the first pulse, 1, has a longer duration (resulting in higher power) than each of the subsequent pulses 2 to 6.

In addition, the time duration between pulses 3 and 4, 4 and 5, and 5 and 6 decreases.

After transmitting each of pulses 1 to 5, the control module detects for the presence of a feedback signal so as to determine if the voltage regulator has switched on or if a further pulse is required.

The predetermined number of pulses pulse before a determination is made that an error has occurred is six.

At the time indicated by 7, the predetermined number of pulses in the pulse train have been transmitted and the control module 105 is monitoring for the presence of a feedback signal to determine if the voltage regulator has switched on and is operating or if an error has occurred.

At the time indicated by 8, there is a delay whilst the voltage built up at the main output of the SMPS due to the pulse train drains away.

At the time indicated by 9, a new start-up sequence is initiated.

Described above is an apparatus in which the voltage regulator 103 is switched on with power provided by a pulse train.

The initial pulse is set to a sufficiently low power that excess voltage does not occur at the main output of the SMPS. Accordingly, the power of the initial pulse is typically not sufficient to switch on the voltage regulator under normal operating conditions, although it may do so if there are significant variations in the operating conditions.

Further pulses in the pulse train are then transmitted in accordance with a feedback signal from the voltage regulator 103 to ensure that sufficient power is provided to the voltage regulator 103 in order for it to switch on.

By ceasing to transmit power to switch on the voltage regulator 103 when it has been determined that the voltage regulator 103 has switched on and is operating, an excessive amount of power is not sent from the primary side to the secondary side in order to switch on the voltage regulator 103.

Consequently, the problem of non-monotonic start-up and glitches experienced at the main output of the SMPS are avoided.

The power supply circuit 102, voltage regulator 103 and control module 105 of FIG. 1 are not limited to specific designs and it would be clear to the skilled person that any circuit designs that perform the above-described functions may be used.

Figure 4:
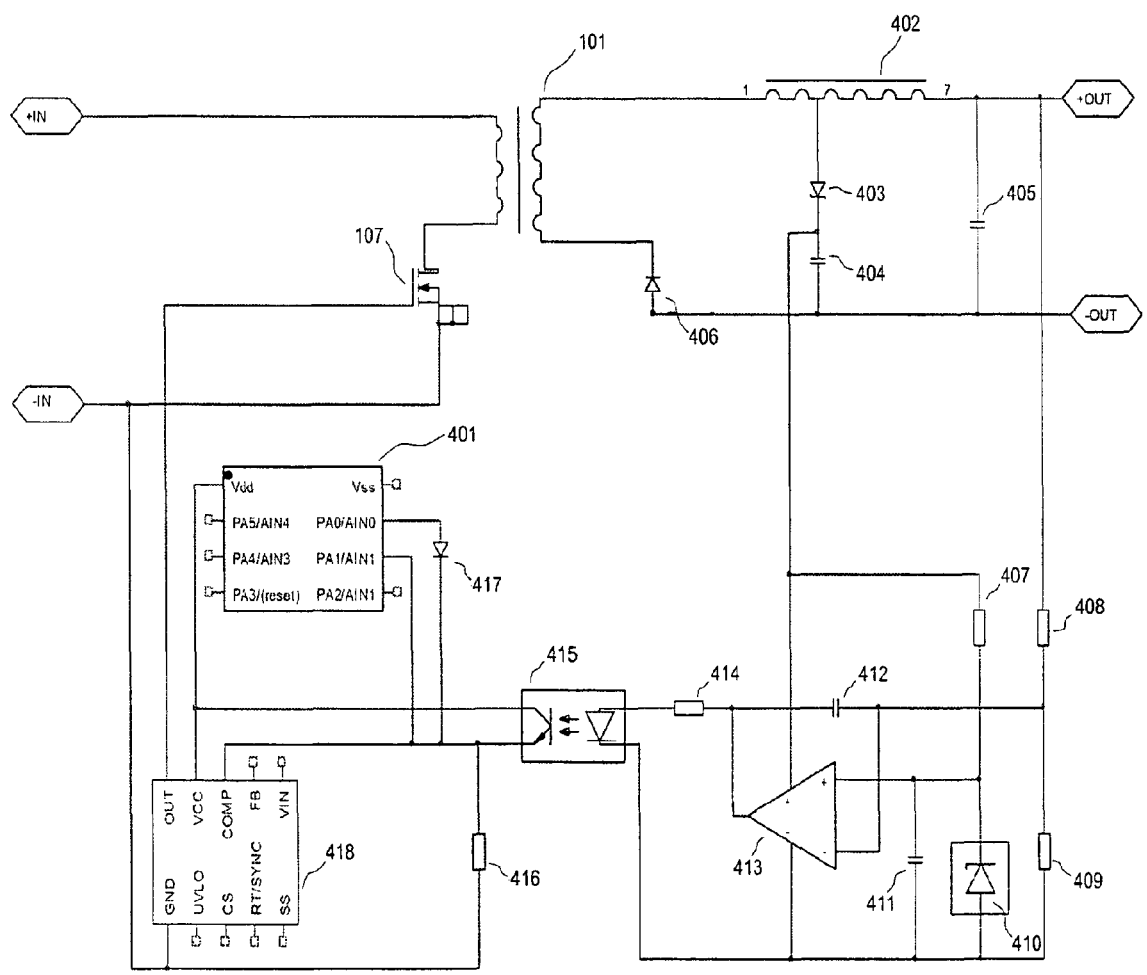
FIG. 4 is a detailed circuit diagram of an SMPS according to an embodiment of the invention.

Purely as an example of a power supply circuit 102, voltage regulator 103, control module 105 and PWM 106 that may be used, a detailed circuit diagram of an SMPS according to an embodiment of the invention is shown in FIG. 4.

The transformer 101 and transistor 107 shown in FIG. 4 correspond to the transformer 101 and transistor 107 in FIG. 1.

Diode 406 is connected between a terminal of transformer 101 on the secondary side and an output terminal. In some SMPS designs a transistor may alternatively be used.

The power supply circuit comprises diodes 403 and 406, inductor 402, and capacitors 404 and 405.

Inductor 402 is connected between a terminal on the secondary side of transformer 101 and an output terminal of the SMPS. Capacitor 405 is connected between the output terminals.

The arrangement of inductor 402 and capacitor 405 provides a main output filter. The change in the output voltage at the output terminals is determined by the time constant of the main output filter. A typical time constant of such a filter is a millisecond.

Diode 403 is connected between a tap within inductor 402 and capacitor 404. Capacitor 404 is connected between diode 403 and an output terminal. The junction between diode 403 and capacitor 404 provides the power supply to the voltage regulator.

The arrangement of the inductor (i.e. the inductance between the start of inductor 402 and the tap within inductor 402), diode 403 and capacitor 403 provides a voltage regulator filter. The inductor acts a current limiter to protect the diode 403. The output voltage to the voltage regulator is determined by the time constant of the voltage regulator filter.

By ensuring that the value of capacitor 404 is less than capacitor 405 and that the inductance of the voltage regulator filter is lower than that of the main output filter, the time constant of the voltage regulator filter can be set to be much lower that that of the main output filter.

Accordingly, during the start-up operation, more power is output to the voltage regulator than from the main output of the SMPS.

The voltage regulator comprises comparator 413 (which, in this example, is an operation amplifier), resistors 407, 408, 409 and 414, capacitors 411 and 412, and Zener diode 410.

The Zener diode 410 is operable to provide a voltage reference. Capacitor 412 is an integrator capacitor for the voltage regulator.

The circuit arrangement of the comparator 413, resistors 407, 408, 409, 414, capacitors 411, 412 and Zener diode 410 is an arrangement for providing output voltage regulation of an SMPS.

An output from the power supply circuit is connected to the power supply terminal of the comparator 413 in the voltage regulator.

Resistor 414 is directly connected to the output of the comparator. The current flowing through resistor 414 is therefore dependent upon the output of the comparator, which, in turn, is dependent upon the response of the comparator to the power received from the power supply circuit.

The output form the voltage regulator to the coupling device 415 is therefore a feedback signal that indicates if the voltage regulator has switched on or not. In some implementations, this output signal from the voltage regulator may be a voltage error signal that is used to determine the duty cycle of the primary side switch.

Coupling device 415 is a wireless coupling device, comprising an LED and phototransistor.

The control module comprises controller 401, diode 417 and resistor 416.

The PWM is provided by the component 418.

The controller 401 and PWM 418 in FIG. 4 are components with many input and output ports. Although some of the ports are shown as unconnected, the skilled person would appreciate that in use there may be connections to these ports.

The primary side output from the coupling device 415 is directly connected to the COMP input of the PWM 418 and the PA1 input of the controller 401.

Output PA0 from the controller is connected to the primary side output from the coupling device 415 via diode 417.

The operation of the SMPS shown in FIG. 4 will now be described.

Before a start-up operation, the COMP input to PWM 218 is low and transistor 107 is not being switched by the PWM.

Output PA0 of the controller 401 starts the start-up operation by going high for 1-3 switch pulses, for example. This causes the COMP input to the PWM 418 to go high and PWM 418 outputs a high pulse to the gate of transistor 107.

In response to the high pulse from the PWM 418, transistor 107 conducts and, for the same duration of the high pulse from the PWM 418, a pulse of the input voltage is applied to the primary side of transformer 101.

A voltage pulse is induced on the secondary side of the transformer 101 and this causes capacitor 404 to charge through diode 403 and part of the inductor 402. Capacitor 405 also charges through inductor 402.

Since the voltage regulator filter has a much lower time constant than the main output filter, the voltage across capacitor 404 rises much faster than that across capacitor 405.

Accordingly, power is provided for switching on the voltage regulator before a significant amount of power has been transferred to the main output terminals of the SMPS. Capacitor 404 need not be fully charged (i.e. top filled) for sufficient power to switch on the voltage regulator to be provided.

As described above, the current output from the voltage regulator to the LED of coupling device 415 is dependent upon the response of the voltage regulator to the power received from the power supply circuit.

If the voltage regulator has switched on and is operating, then this will be indicated by the magnitude of current flowing through the LED being above a predetermined level.

Alternatively, if the voltage regulator is not operating as required, no feedback signal is generated and the magnitude of the current flowing through the LED is below a predetermined level.

The feedback signal on the primary side, which is the current generated through the phototransistor, therefore provides an indication of whether the voltage regulator has switched on as desired.

The signal from the phototransistor is input to input PA1 of the controller 401 so the controller can determine the response of the voltage regulator.

In order to avoid control signals sent to the PWM 418 disrupting the detection of a feedback signal, the controller 401 is arranged so that it does not detect the signal from the phototransistor when it is sending a control pulse to the PWM 418.

More particularly, when the input PA1 to controller 401 is detecting the signal from the phototransistor, the output PA0 of controller 401 is low. Diode 417 is therefore provided to ensure that the state of the output PA0 does not affect the signal from the phototransistor.

The detection of the signal from the phototransistor at input PA1 of the controller therefore allows a determination as to whether the voltage regulator has switched on and is operating, a further pulse needs to be sent or if an error has occurred.

In an alternative arrangement, the control of PWM 418 by controller 401 may be performed by the output PA0 toggling to a negative voltage and diode 417 having a reversed polarity.

Figure 5:
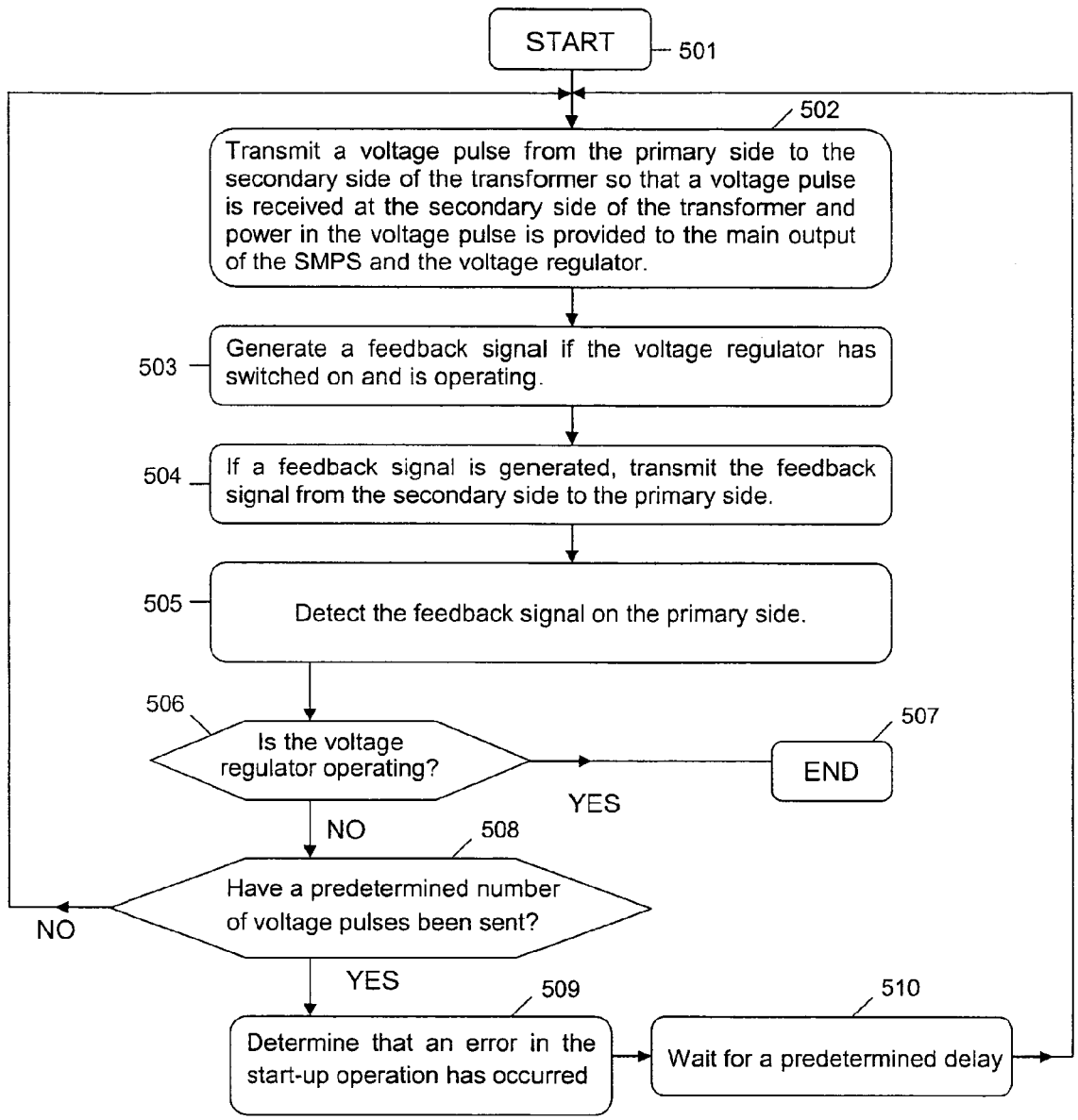
FIG. 5 is a flowchart showing a method according to an embodiment of the invention.

The processing operations performed by an embodiment of the invention will now be described with reference to FIG. 5.

At step 501, the process begins.

In step 502, an initial voltage pulse is transmitted from the primary side to the secondary side of the transformer so that a voltage pulse is received at a secondary side of the transformer and power in the voltage pulse is provided to the main output of the SMPS and the voltage regulator.

The process then proceeds to step 503 where a feedback signal is generated if the voltage regulator has switched on and is operating. If a feedback signal is generated, the process then proceeds to step 504 where the generated feedback signal is transmitted from circuitry on the secondary side of the transformer to circuitry on the primary side of the transformer.

It will be appreciated that in some implementations steps 503 and 504 may alternatively be performed in a single step.

The process then proceeds to step 505 where the feedback signal is detected on the primary side.

The process then proceeds to step 506 where a determination is made if the voltage regulator is operating.

More particularly, if it is determined at step 506 that a feedback signal was detected at step 505, then it is determined that the voltage regulator has switched on and is operating, and therefore the process proceeds to step 507 and ends.

However, if in step 506 a determination is made that the voltage regulator is not operating because no feedback signal was detected at step 505, then the process proceeds to step 508.

In step 508, a determination is made if a predetermined number of voltage pulses have been sent.

If a predetermined number of voltage pulses have not been sent, then the process returns to step 502 and a further voltage pulse is sent from the primary side to the secondary side of the transformer.

If, however, in step 508 a determination is made that a predetermined number of voltage pulses have been sent, then the process proceeds to step 509 where a determination is made that an error in the start-up operation has occurred.

The process then proceeds to step 510 and waits for a predetermined delay to ensure that any voltage at the main output of the SMPS has drained away.

After the predetermined delay, the predetermined number of voltage pulses to be sent before an error is determined is reset and the process returns to step 502 to start a new start-up operation.

[Modifications and Variations]

Many modifications and variations can be made to the embodiments described above.

Figure 6A:
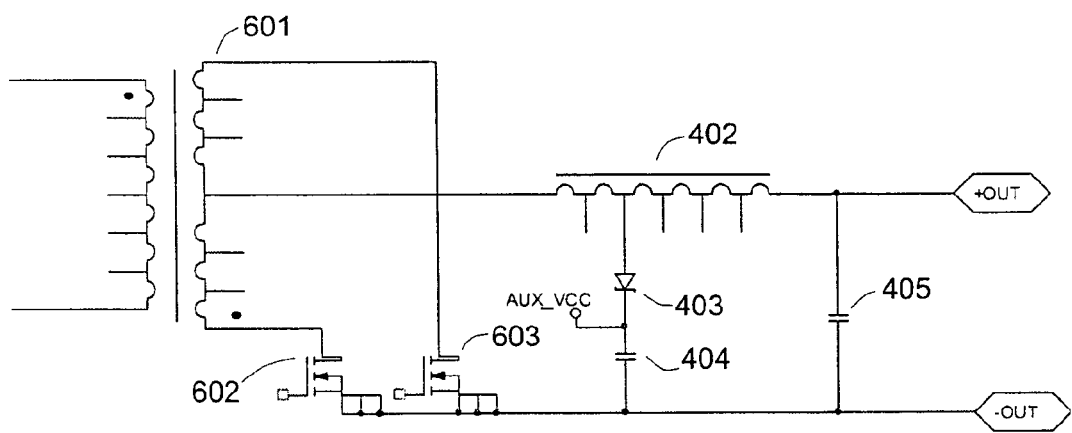
FIGS. 6A and 6B show alternative arrangements of a transformer and power supply circuit for use in embodiments of the invention.
Figure 6B:
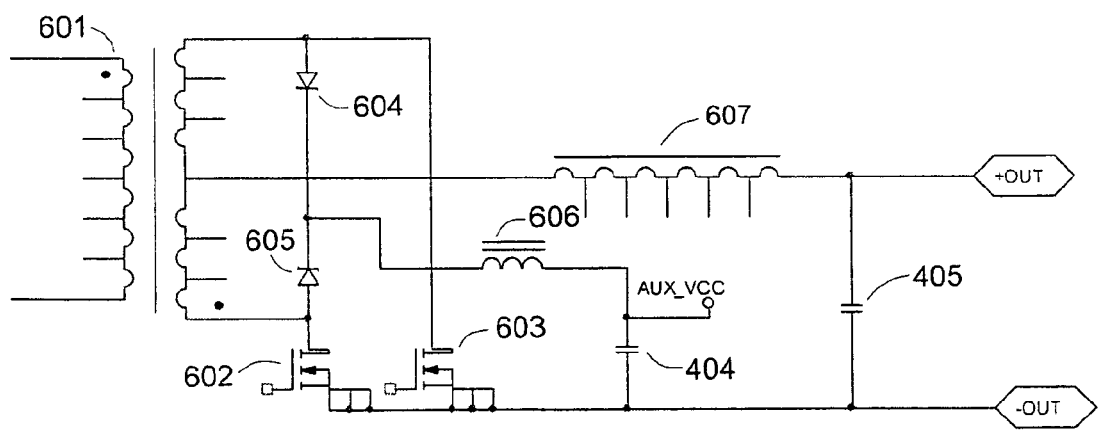

For example, shown in FIGS. 6A and 6B are alternative designs and arrangements of power supply circuit and transformer from that shown in FIG. 4.

The designs of power supply circuit in FIGS. 4, 6A and 6B are all appropriate for supplying, for a limited time, small electronic circuits with a low power consumption.

Both of the circuits in FIG. 6A and 6B differ from that in FIG. 4 in that a tap on the secondary side of the transformer is fed to the power supply circuit rather than both of the end terminals.

The connection to any of the taps of the transformer can be varied as required.

In addition, transistors are provided at each terminal of the secondary side of the transformer. These alternative transformer arrangements are well known in SMPS designs.

In FIG. 6A, the main output filter and the voltage regulator filter both share part of inductor 402.

This shared inductor arrangement is the same as that already used in the power supply circuit of FIG. 4.

The inductance of the inductor of the main output filter is set by the entire length of inductor 402. However, the inductance of the inductor of the voltage regulator filter is set by just part of the length of the inductor 402. By using a different tap within the inductor 402, the inductance of the voltage regulator filter can be changed as desired.

Since the main output filter and the voltage regulator filter share part of the same inductor, a cost efficient design is realised that requires less components than an arrangement with separate inductors.

However, the setting of the time constants of each filter is more restrictive and so a high transformer voltage may be required before the required voltage is output to the voltage regulator circuit.

The arrangement in FIG. 6B differs from that in FIG. 6A in that the filters do not share part of the same inductor. Inductor 607 and capacitor 405 provide the main output filter of the SMPS. Inductor 606 and capacitor 404 provide the voltage regulator filter.

The separate inductors allow more flexibility in the setting of the time constants of each filter and so it is easier to output a desired voltage to the voltage regulator. However, the power supply circuit in FIG. 6B requires more components.

Many other modifications and variations are possible.

For example, in the above-described embodiment, the voltage regulator 103 only generates a feedback signal when the voltage regulator 103 is switched on and operating. In an alternative embodiment, a feedback signal is generated that represents the current state of the voltage regulator 103. The feedback signal is generated and output to coupling device 104 and transmitted to the primary side either continuously or after each voltage pulse. The control module 105 is arranged to monitor the feedback signal on the primary side. If the feedback signal has a voltage or current magnitude above a predetermined level, for example, then this provides an indication that the voltage regulator has switched on and is operating as required. Alternatively, if the feedback signal has a voltage or current magnitude below a predetermined level, for example, then this provides an indication that the voltage regulator needs more power to operate as required. The level of the feedback signal (i.e. current or voltage magnitude) represents the response of the voltage regulator 103 to received power. Accordingly, in this modification, the control module 105 monitors a level of the feedback signal and determines if the voltage regulator 103 has switched-on and is operating in dependence upon the level of feedback signal rather than making such a determination on the detection of the presence of a feedback signal.

By way of further example, it is possible for the power in the initial pulse for switching on the voltage regulator to be set at a level which is high enough to switch on the voltage regulator under normal operating conditions. Subsequent pulses to switch on the voltage regulator would then only be required under significantly different operating conditions.

Referring again to FIG. 3, the pattern of the pulse train is defined by the width of each pulse, the duration between each pulse and the predetermined number of pulses to be transmitted before a determination is made that an error has occurred. It is possible for a number of pulse train patterns to be defined and for a pattern to be selected for a start-up operation in dependence upon at least one operating condition (such as input voltage or temperature) of the SMPS. Accordingly, a pulse train with the most appropriate pattern for the environment is applied.

In the pulse train of FIG. 3, each pulse is defined by a continuous high signal. Alternatively, one or more of the pulses may be defined by a burst (i.e. a series of short high signals).

In FIG. 1, the control module 105 is shown as a separate unit from the PWM 106. Alternatively, the control module may be incorporated into the PWM 106 so that the control module and PWM are housed in a single circuit.

In the above-described embodiment of FIG. 1, the control module 105 detected the feedback signal after transmitting each pulse. However, the control module is not restricted to detecting the control signal after each pulse and may, for example, detect the feedback signal after every other pulse.

In the above-described embodiment of FIG. 1, the type of SMPS was a DC/DC converter. The embodiment could alternatively have been described with an AC/DC converter (rectifier) type of SMPS.

The foregoing description of embodiments of the invention has been presented for the purpose of illustration and description. It is not intended to be exhaustive or to limit the invention to the precise form disclosed. Alternations, modifications and variations can be made without departing from the spirit and scope of the present invention.

The invention claimed is:

1. A switched mode power supply comprising:
a transformer having a primary side and a secondary side;
a main output of the switched mode power supply arranged on the secondary side and arranged to output an output voltage;
a voltage regulator arranged on the secondary side and operable to regulate the output voltage at the main output of the switched mode power supply;
a power supply circuit arranged to provide a power supply on the secondary side, wherein the power supply circuit is operable to receive power from the primary side via the transformer and to output power to the main output and also to the voltage regulator;
a control module on the primary side operable to control a pulse width modulator to send a voltage pulse train, comprising a first pulse and a plurality of pulses subsequent to the first pulse, from the primary side to the secondary side via the transformer in order to switch on the voltage regulator; and
a coupling device operable to transmit a feedback signal from the secondary side to the primary side, wherein the feedback signal is generated in dependence upon the response of the voltage regulator to the power received from the power supply circuit;
wherein the control module is operable to detect the feedback signal to determine if the voltage regulator has switched on and is operating, and to determine if a further pulse in the voltage pulse train is to be transmitted from the primary side to the secondary side in dependence upon the detection of the feedback signal; and
the control module is arranged to control the pulse width modulator to transmit the voltage pulse train such that the first of the pulses has a higher power than any of the subsequent pulses in the voltage pulse train.

2. The switched mode power supply according to claim 1 wherein the control module is arranged to control the pulse width modulator to stop transmitting pulses in the voltage pulse train in order to switch on the voltage regulator when either a feedback signal has been detected indicating that the voltage regulator has switched on and is operating or a predetermined number of pulses have been transmitted.

3. The switched mode power supply according to claim 1, wherein the control module is arranged to control the pulse width modulator to transmit the voltage pulse train such that the first of the pulses has a longer duration than any of the subsequent pulses in the voltage pulse train.

4. The switched mode power supply according to claim 1, wherein the control module is operable to control the pulse width modulator to transmit the voltage pulse train with at least three pulses such that the duration between the first two pulses of the at least three pulses of the voltage pulse train is greater than the duration between the last two pulses of the at least three pulses of the voltage pulse train.

5. The switched mode power supply according to claim 1, wherein the control module is arranged to determine that an error has occurred if a predetermined number of pulses have been transmitted and a feedback signal has not been received indicating that the voltage regulator has switched on and is operating.

6. The switched mode power supply according to claim 1, wherein the feedback signal and the output of the control module for controlling the pulse width modulator are input to the same input of the pulse width modulator, and a diode is arranged between said input of the pulse width modulator and the output of the control module so that current does not flow between the control module output and the pulse width modulator when the control module is not sending a control signal to the pulse width modulator.

7. The switched mode power supply according to claim 1, wherein the control module is part of the pulse width modulator.

8. The switched mode power supply according to claim 1, wherein:
the switched mode power supply further comprises means for storing a plurality of different patterns for the voltage pulse train, wherein a pattern for a pulse train is defined by the width of each pulse, the duration between each pulse and a predetermined number of pulses to be transmitted before a determination is made that an error has occurred; and
the control module is operable to select a pattern of the voltage pulse train in order to switch on the voltage regulator in dependence upon at least one operating condition of the switched mode power supply.

9. A method of operating a switched mode power supply having a transformer with a primary side and a secondary side, a main output of the switched mode power supply arranged on the secondary side, and a voltage regulator arranged on the secondary side to receive power from the primary side and to regulate the output voltage at the main output of the switched mode power supply, the method being performed to switch on the voltage regulator and comprising:
transmitting a first voltage pulse from the primary side to the secondary side of the transformer so that the first voltage pulse is received at the secondary side of the transformer and power in the first voltage pulse is provided to the main output of the switched mode power supply and the voltage regulator;
when the voltage regulator is caused to switch on and operate by the voltage pulse, generating a feedback signal indicating that the voltage regulator is switched on and operating,
transmitting the feedback signal from the secondary side to the primary side;
determining if a feedback signal has been detected on the primary side indicating that the voltage regulator is switched on and operating;
when no feedback signal is detected on the primary side indicating that the voltage regulator is switched on and operating, transmitting at least one further voltage pulse from the primary side to the secondary side; and when a feedback signal is detected on the primary side indicating that the voltage regulator is switched on and operating, ceasing to transmit voltage pulses from the primary side to switch on the voltage regulator;

wherein the first voltage pulse transmitted from the primary side to the secondary side of the transformer has a higher power than the at least one further voltage pulse.

10. The method according to claim 9 wherein the pulses are transmitted from the primary side to the secondary side in order to start the voltage regulator until either a determination is made that a feedback signal has been detected on the primary side indicating that the voltage regulator is switched on and operating or that a predetermined number of pulses have been transmitted.

11. The method according to claim 9 wherein the first voltage pulse is transmitted with a longer duration than the at least one further voltage pulse.

12. The method according to any of claim 9 wherein at least three voltage pulses are transmitted from the primary side to the secondary side of the transformer and the duration between the first two of the at least three voltage pulses is greater than the duration between the last two of the at least three voltage pulses.

13. The method according to any of claim 9, wherein:

a plurality of different patterns for the voltage pulse train are stored, wherein a pattern for a pulse train is defined by the width of each pulse, the duration between each pulse and the predetermined number of pulses to be transmitted before a determination is made that an error has occurred; and a pattern of the voltage pulse train to be transmitted in order to switch on the voltage regulator is selected in dependence upon at least one operating condition of the switched mode power supply.

* * * * *

UNITED STATES PATENT AND TRADEMARK OFFICE
CERTIFICATE OF CORRECTION

Page 1 of 1

PATENT NO. : 8,964,416 B2
APPLICATION NO. : 13/635197
DATED : February 24, 2015
INVENTOR(S) : Persson et al.

It is certified that error appears in the above-identified patent and that said Letters Patent is hereby corrected as shown below:

In the Specification

In Column 3, Line 43, delete "LIST OF FIGURES" and insert -- BRIEF DESCRIPTION OF DRAWINGS --, therefor.

In Column 3, Line 61, delete "DESCRIPTION" and insert -- DETAILED DESCRIPTION --, therefor.

In Column 9, Line 25, delete "capacitor 403" and insert -- capacitor 404 --, therefor.

In Column 9, Line 33, delete "that that" and insert -- than that --, therefor.

In Column 9, Line 55, delete "form" and insert -- from --, therefor.

In the Claims

In Column 16, Line 1, in Claim 12, delete "to any of claim" and insert -- to claim --, therefor.

In Column 16, Line 1, in Claim 13, delete "to any of claim" and insert -- to claim --, therefor.

Signed and Sealed this
Eleventh Day of August, 2015

Michelle K. Lee
*Director of the United States Patent and Trademark Office*